(12) United States Patent
Gilstring

(10) Patent No.: US 9,474,202 B2
(45) Date of Patent: Oct. 25, 2016

(54) AGRICULTURAL IMPLEMENT AND METHOD FOR FEEDING GRANULAR MATERIAL

(71) Applicant: Vaderstad-Verken AB, Vaderstad (SE)

(72) Inventor: Gert Gilstring, Vadstena (SE)

(73) Assignee: VÄDERSTAD HOLDING AB, Vaderstad (SE)

( * ) Notice: Subject to any disclaimer, the term of this patent is extended or adjusted under 35 U.S.C. 154(b) by 147 days.

(21) Appl. No.: 14/404,783

(22) PCT Filed: Mar. 14, 2013

(86) PCT No.: PCT/SE2013/050254
§ 371 (c)(1),
(2) Date: Dec. 1, 2014

(87) PCT Pub. No.: WO2013/180619
PCT Pub. Date: Dec. 5, 2013

(65) Prior Publication Data
US 2015/0189827 A1    Jul. 9, 2015

(30) Foreign Application Priority Data
May 31, 2012 (SE) ...................... 1250564

(51) Int. Cl.
| A01C 7/04 | (2006.01) |
| A01C 7/20 | (2006.01) |
| A01C 7/08 | (2006.01) |
| A01C 15/04 | (2006.01) |
| A01C 21/00 | (2006.01) |

(52) U.S. Cl.
CPC ............... *A01C 7/082* (2013.01); *A01C 7/042* (2013.01); *A01C 7/081* (2013.01); *A01C 15/04* (2013.01); *A01C 21/00* (2013.01); *A01C 7/046* (2013.01)

(58) Field of Classification Search
CPC ....... A01C 7/082; A01C 7/042; A01C 15/04
USPC ......................................... 111/179, 181, 185
See application file for complete search history.

(56) References Cited

U.S. PATENT DOCUMENTS

| 2,777,576 | A |  | 1/1957 | Stevenson |
| 3,006,470 | A |  | 10/1961 | Franken |
| 4,060,181 | A |  | 11/1977 | Grataloup |
| 4,280,419 | A | * | 7/1981 | Fischer .................. A01C 15/04 111/174 |
| 4,450,979 | A |  | 5/1984 | Deckler |

(Continued)

FOREIGN PATENT DOCUMENTS

| DE | 3739186 | 6/1989 |
| DE | 102010016389 | 10/2011 |

(Continued)

*Primary Examiner* — John G Weiss
(74) *Attorney, Agent, or Firm* — Hayes Soloway, P.C.

(57) ABSTRACT

A device for feeding granular material, such as seed, fertilizer or pesticide is described herein. The device includes at least two metering devices (109), a first drive device (101) for generating a pressurizing airflow (FT) for pressurization of the metering devices (109), and a central container (102), which is arranged to, via respective feed ducts (103), with the aid of a respective feed airflow (FI), feed the material to the respective metering device (109). The device also includes a second drive device (201, 201a, 201b) for generating the feed airflow (FI) and a merging connection (118, 118') for merging at least a part (FL) of the feed airflow (FI) with the pressurizing airflow (FT).

13 Claims, 3 Drawing Sheets

(56) References Cited

U.S. PATENT DOCUMENTS

| | | |
|---|---|---|
| 5,156,102 A | 10/1992 | Anderson |
| 5,161,473 A | 11/1992 | Landphair et al. |
| 5,379,706 A | 1/1995 | Gage et al. |
| 5,392,722 A | 2/1995 | Snipes et al. |
| 5,406,897 A | 4/1995 | Pingry |
| 5,915,312 A | 6/1999 | Meyer et al. |
| 6,047,652 A | 4/2000 | Prairie et al. |
| 6,164,222 A | 12/2000 | Mayerle et al. |
| 6,253,693 B1 | 7/2001 | Mayerle et al. |
| 6,267,067 B1 | 7/2001 | Mayerle et al. |
| 6,298,797 B1 | 10/2001 | Mayerle et al. |
| 6,609,468 B1 | 8/2003 | Meyer et al. |
| 6,782,835 B2 * | 8/2004 | Lee ................. A01C 7/081 111/174 |
| 6,935,256 B1 | 8/2005 | Meyer |
| 7,966,954 B2 | 6/2011 | Anderson et al. |
| 2005/0235889 A1 | 10/2005 | Martin et al. |
| 2010/0107945 A1 | 5/2010 | Beaujot |
| 2010/0122644 A1 | 5/2010 | Memory |
| 2010/0313801 A1 | 12/2010 | Peterson et al. |
| 2011/0162566 A1 | 7/2011 | Wilhelmi et al. |
| 2015/0282422 A1 * | 10/2015 | Hahn ................. A01C 7/20 111/185 |
| 2016/0165794 A1 * | 6/2016 | Czapka ............. A01C 14/00 111/185 |

FOREIGN PATENT DOCUMENTS

| | | |
|---|---|---|
| EP | 1591000 | 2/2005 |
| GB | 899449 | 6/1962 |
| RU | 2186636 | 10/2002 |
| RU | 2401704 | 10/2010 |
| RU | 2447953 | 4/2012 |
| SE | 534518 | 5/2011 |
| SE | 534736 | 5/2011 |
| WO | 2011056123 | 5/2011 |

* cited by examiner

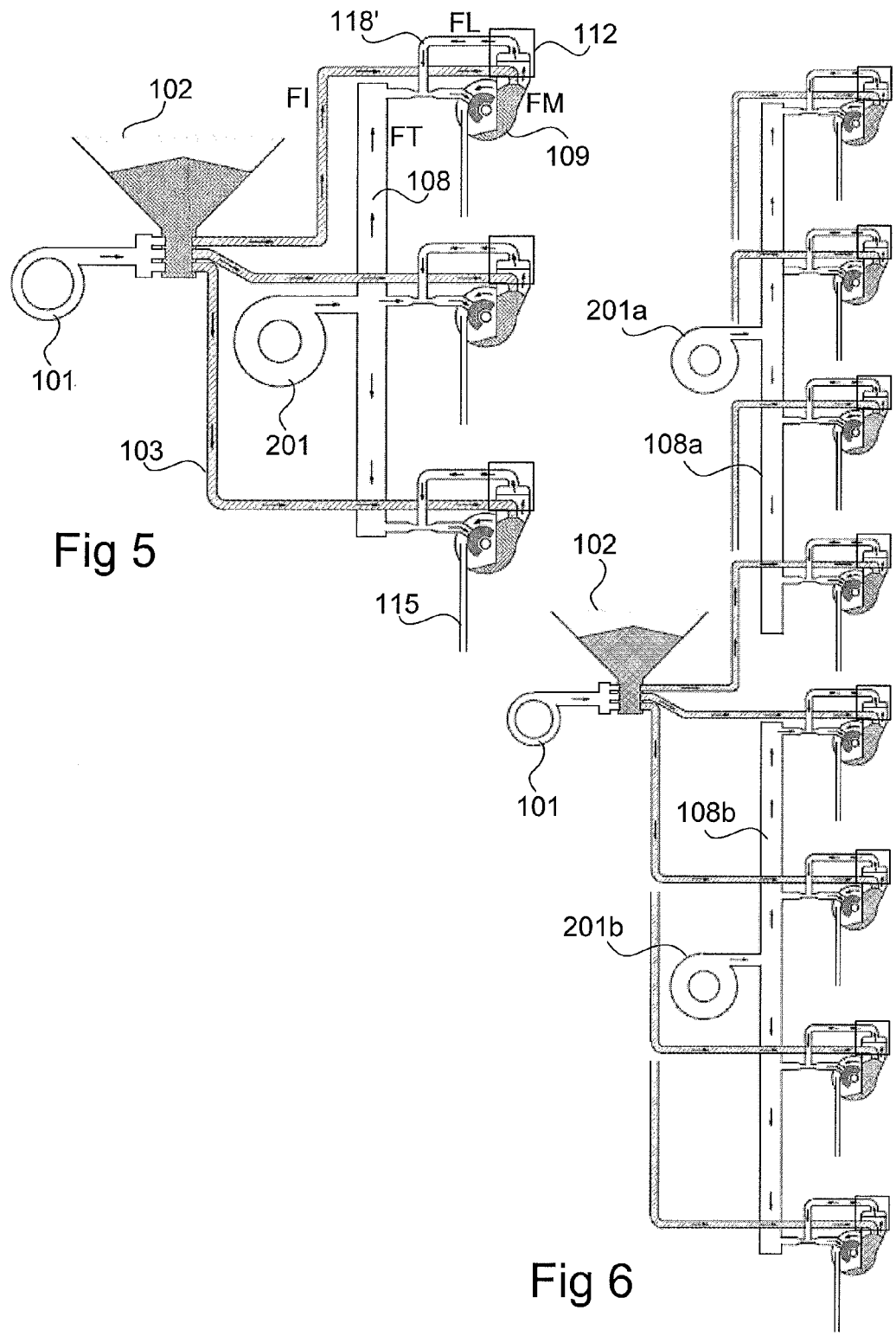

AGRICULTURAL IMPLEMENT AND METHOD FOR FEEDING GRANULAR MATERIAL

TECHNICAL FIELD

The present document relates to a so-called "nursing system" for distributing granular material in an agricultural implement, such as a seed drill, a precision seed drill, a fertilizer spreader or a pesticide spreader, and in particular to systems of the kind having compressed air-assisted dispensing of the granular material. The document also relates to a method for distributing granular material in an agricultural implement.

BACKGROUND

It is known to provide seed drills in which a central seed container is arranged to feed seed to a plurality of row units, each of which comprises a metering device for controlling the dispensed quantity of seed for the attainment of a predefined mutual spacing between seedlings belonging to the respective row.

If the metering device operates with normal air pressure on the material side of the singling disc, an underpressure is generally present on the opposite side thereof for take-up of the seed on the disc prior to dispensing through a purposely designed outlet. The airflow which transported the seed is usually released at the seed containers of the metering devices.

Alternatively, the metering device operates with an overpressure on the material side of the singling disc, which overpressure produces take-up of the seed on the singling disc. This design is especially suitable for precision sowing.

U.S. Pat. No. 5,156,102 shows a device for distributing granular material in a seed drill. The device comprises a drive device which feeds seed from a central seed container to a metering device via a feed duct. An air duct is connected to the feed duct upstream of the connection of the central container to the feed duct.

It is desirable to provide "nursing systems" which allow a good ambient air environment and working environment for the user. Problems which can arise include, for example, that mordant residues are spread by air to vegetation, animals and water courses in the surroundings. It is also desirable to provide precision seed drills which have a reduced power requirement and which are insensitive to disturbances in the compressed air-assisted dispensing of granular material.

SUMMARY

One object is to provide a "nursing system" which eliminates or reduces the problems with the prior art.

The invention is defined by the appended independent patent claims. Non-limiting embodiments emerge from the dependent patent claims, the appended drawings and the following description.

According to a first aspect, an agricultural implement having a device for feeding granular material, such as seed, fertilizer or pesticide, is provided. The device comprises at least two metering devices, a central container for granular material and a first and second drive device. The first drive device generates via a pressurizing air duct connected to the metering devices a pressurizing airflow for pressurization of the metering devices. The second drive device generates a feed airflow which via feed ducts transports the granular material from the central container to the metering devices. The device further comprises a merging connection for merging at least a part of the feed airflow with the pressurizing airflow.

By "merging" is here meant that the whole or a part of the feed airflow is merged with the airflow which produces the pressurization of the metering devices. A part of the airflow which is generated in the agricultural implement is thus fed back to the agricultural implement, but to another function.

By providing two or more separate drive devices, optimal driving and control of the respective flow is enabled, which means that the precision in the material dispensing can be maintained regardless of the feed conditions in the feeding of material forward to the metering devices.

The fact that at least a part of the feed airflow is merged with the pressurizing airflow and is thus used to pressurize the metering devices means that the power requirement of the "nursing system" is reduced.

Each metering device comprises a separator, which separates the granular material from the feed airflow, thereby resulting in a material flow and an airflow, and also a merging connection, by which the said airflow can be merged with the pressurizing airflow. The merging connection can comprise a Venturi tube or a constriction for increasing the flow velocity. The merging connection results in the feed airflow being fed out through the seed outlet. The airflow thus leaves "the nursing system" at, or even below, ground level, which reduces the risk of any impurities in the airflow being spread to the user.

The agricultural implement can have a pressurizing air duct connected to the metering devices. The pressurizing air duct is possibly provided with a connection upstream of the connection of the pressurizing air duct to a metering device, which connection is arranged to receive the airflow separated from the material and outflowing from the separator.

The separator can be directly connected to the pressurizing air duct or connected via a merging duct.

The second drive device can be arranged to generate a greater air pressure than the first drive device.

The metering device can comprise a singling device, which dispenses the granular material piece by piece, and a singling disc having a low-pressure side and a high-pressure side to which the pressurizing air duct can be connected. The high-pressure side can be provided with an inlet for the granular material.

It can be possible to drive the first and second drive devices independently of each other.

According to a second aspect, a method for dispensing granular material, such as seed, fertilizer or pesticide, in an agricultural implement is provided. The method comprises feeding the granular material from a central container to at least two metering devices with the aid of a feed airflow, separating the granular material from the feed airflow, generating the pressurizing airflow which pressurizes the metering devices, singling the granular material in the metering devices and dispensing individual granules in series. The pressurizing and feed airflows are generated by a first and a second drive device respectively. When the granular material is separated from the feed airflow, a material flow and an airflow are produced, which airflow is at least partially merged with the pressurizing airflow.

The airflow can be merged with the pressurizing airflow upstream of the inlet of the pressurizing airflow in the metering device.

The method can comprise feeding pressurizing airflow and material flow to a high-pressure side of a singling device. This can be realized via a separate input for each flow.

BRIEF DESCRIPTION OF THE DRAWINGS

FIGS. 5 and 6 are schematic views of an alternative so-called "nursing system" according to one embodiment, in which the merging connection 118 is constituted by a duct 118' and the systems comprise one and two drive devices 201, 201a, 201b respectively.

DESCRIPTION OF EMBODIMENTS

Figure 1:
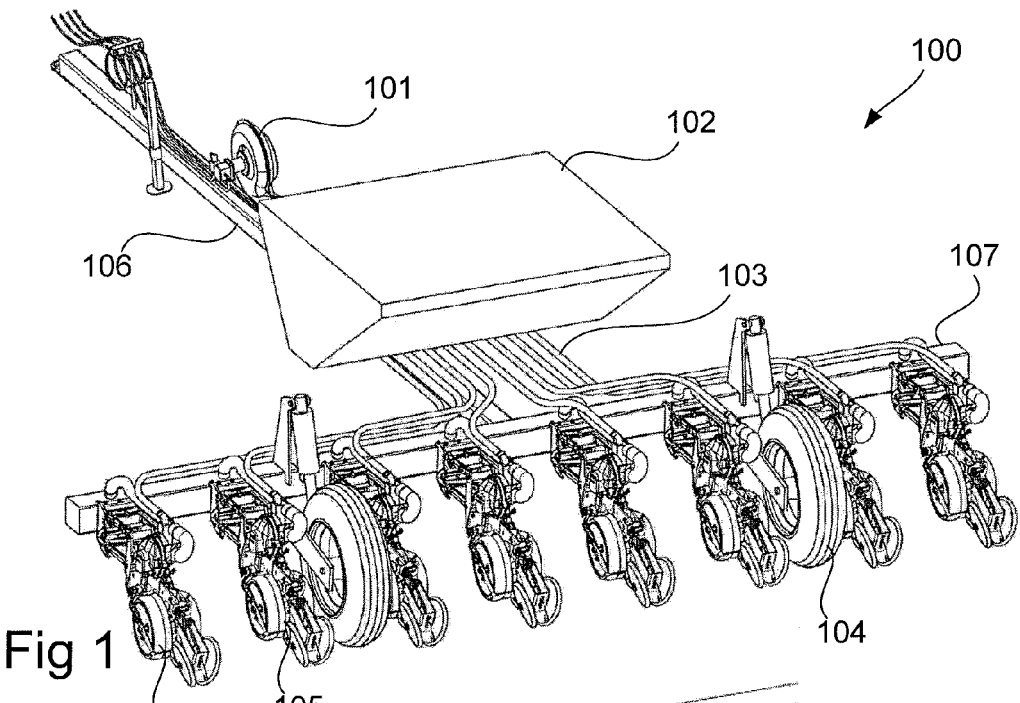
FIG. 1 is a schematic perspective view of an agricultural implement 100.

FIG. 1 shows an agricultural implement 100 in the form of a precision drill. The agricultural implement can comprise a frame 106, 107, which supports a central seed container 102 from which seed is driven with the aid of a blower 101 via feed ducts 103 to a plurality of (here eight) row units 105. The agricultural implement 100 can also have a pair of supporting wheels 104, which can be used as support for the agricultural implement 100 during sowing and which can be height-adjustable so as also to be able to constitute transport support during road transport.

Figure 2:
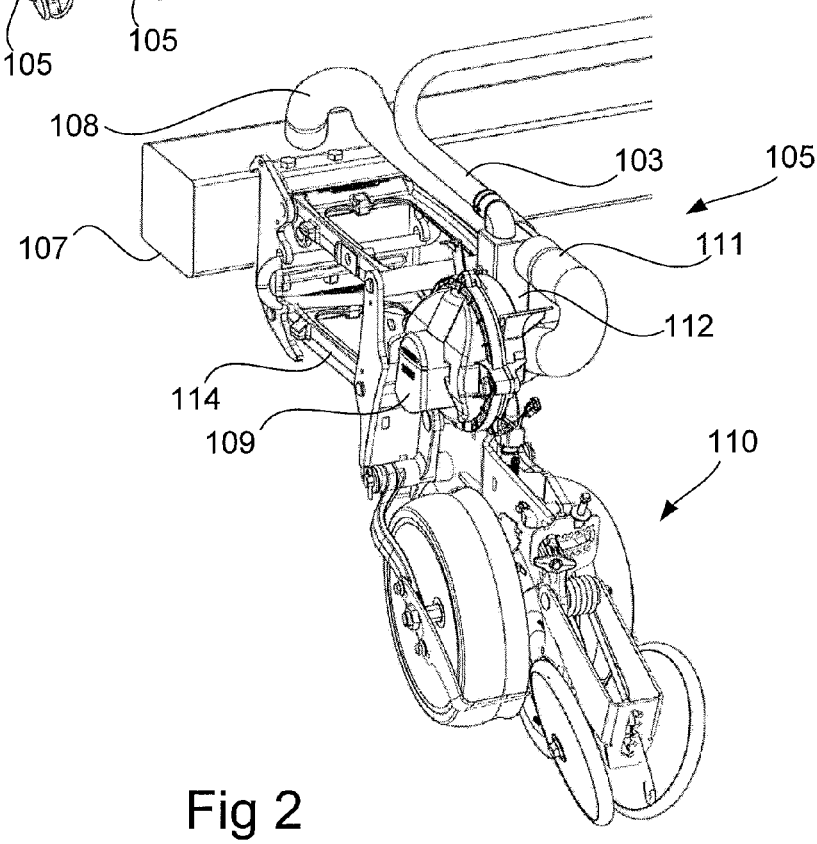
FIG. 2 is a schematic perspective view of a row unit 105.

FIG. 2 shows a row unit 105 of the agricultural implement 100 in FIG. 1 and, more specifically, the row unit furthest to the left in FIG. 1.

The row unit 105 can be attached to a transverse part 107 of the frame of the agricultural implement 100. A height-adjusting mechanism 114 can support a metering device 109, as well as a sowing device 110. The metering device 109 is fed via a pressurizing air duct 108 with a pressurizing airflow for pressurization of the metering device. Via a feed duct 103, the metering device 109 is fed with an airflow mixed with seed.

A separator unit 112 can be arranged to separate from the airflow the seed entering the feed duct 103.

From the separator unit 112, outgoing air can be merged with the pressurizing air duct 108 and fed together with the drive airflow via an air inlet duct 111 to the metering device 109.

Figure 3:
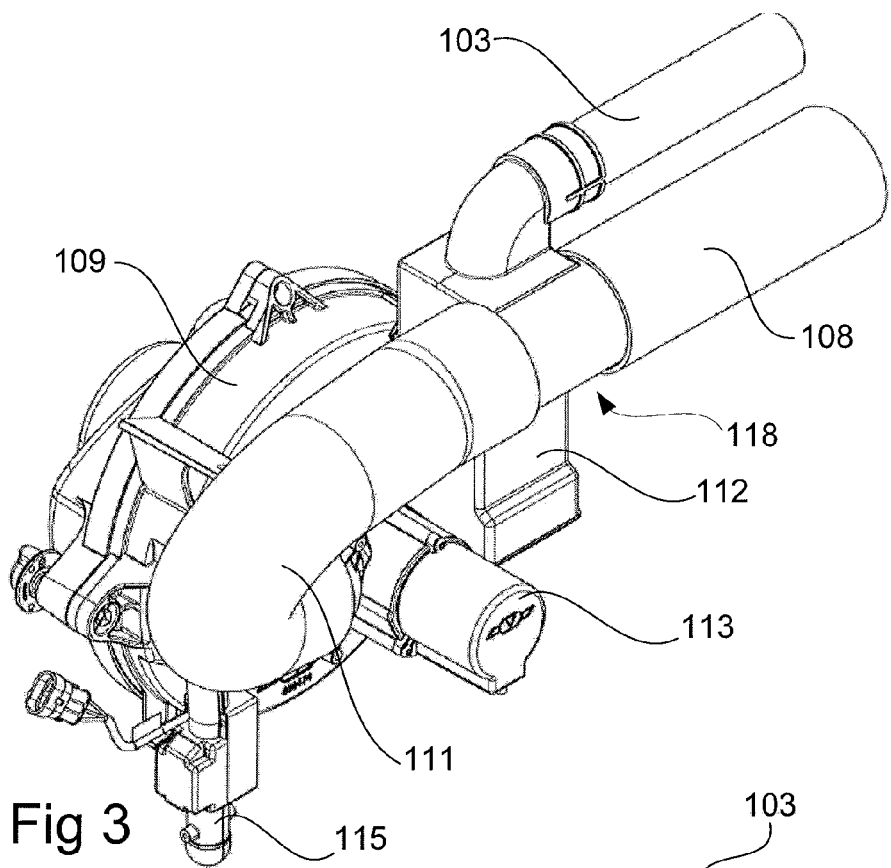
FIG. 3 is a schematic perspective view of a metering device 109 with an integrated separator unit 112.

FIG. 3 shows a perspective view of the metering device 109 and of ducts which run into this same, inclusive of the air inlet duct 111, the feed duct 103 and the pressurizing air duct 108. In FIG. 3 can also be seen a casing 113 for a motor (for example an electric motor) which can drive a singling disc 116 in the metering device 109. The seed outlet 115, via which seed can be fed from the metering device 109 to the sowing device 110, can also be seen.

In order to produce the merging connection, the air outlet of the separator unit 112 is here directly connected to the pressurizing air duct 108, without any intermediate duct. In addition, the separator 1121 can be partially accommodated in the pressurizing air duct, such that a portion of the separator 1121 juts into the pressurizing air duct 108.

Figure 4:
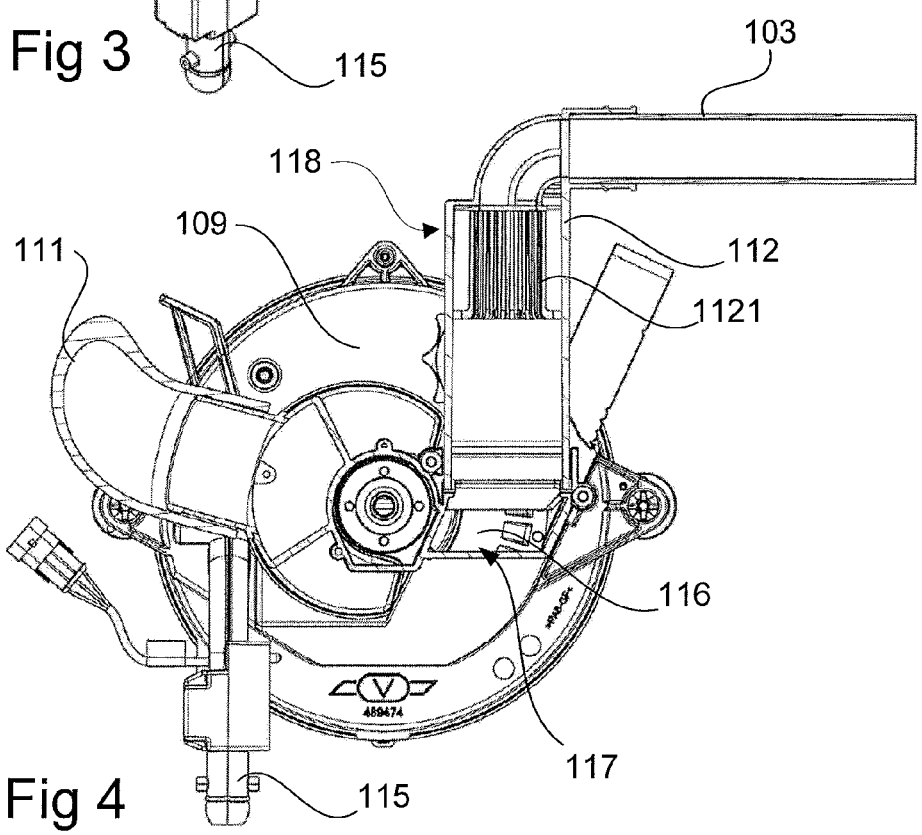
FIG. 4 is a sectional view of the metering device in FIG. 3.

In FIG. 4 is shown a sectional view of the metering device 109. The separator unit 112 is here shown in sectioned view. The metering device 109 can have a material inlet 117, to which the separator unit 112 can be connected. The metering device 109 can also have a rotatable singling disc 116, which delimits a space in which a positive air pressure from the air inlet duct 111 can be present. The material outlet of the separator unit 109 can be open towards the space containing positive air pressure, so that the seed is fed to the singling disc 116 with the aid of gravitational force.

FIG. 5 is a schematic view of a so-called "nursing system" according to one embodiment, in which the merging connection comprises a duct 118'. In the figure is shown a central seed container 102, to which are connected a first blower 101 and feed ducts 103 which connect the central seed container 102 to three separator units 112. Each separator unit 112 is connected to a metering device 109 and via a merging duct 118 to the pressurizing air duct 108, which connects the overpressure side of the metering device 109 to a second blower 201. A seed outlet 115 can also be seen.

FIG. 6 is a schematic view of a so-called "nursing system" according to one embodiment, in which the merging connection comprises a duct 118' and the system has two blowers 201a, 201b, which are connected to a respective pressurizing air duct 108a, 108b. The first blower 101 connected to the central seed container 102 is also illustrated.

During operation of the agricultural implement, the first blower 101 generates a feed airflow, which transports the granular material in the central seed container 102 to at least two separator units 112 via a feed duct 103 associated with each separator unit. The separator unit 112 can separate the granular material from the feed airflow, which results in a material flow and an airflow. The granular material is subsequently transported via a material inlet 117 to the metering device 109 which is associated with the respective separator unit and to which also the separated airflow is guided via a merging connection 118, 118'. Air, which may be contaminated with, for example, mordant residues from the granular material, is thus not released at the metering device. The design can be made energy-efficient, moreover, since remaining airflow and pressure from the feed duct are used to pressurize the metering device.

To the metering device 109 is also guided, via the pressurizing air duct 108, a pressurizing airflow, which, together with the separated airflow, can produce an overpressure on one side of the singling disc 116 of the metering device 109, which overpressure can help to dispense the granular material through the seed outlet 115. For reduced turbulence, it is desirable for the pressurizing airflow and the separated airflow to have approximately equal pressure when they merge. By virtue of the above-described merger of the feed airflow, this will be fed out through the seed outlet 115. The airflow thus leaves the "nursing system" at, or even below, ground level, which reduces the risk of possible impurities in the airflow being spread to the user.

The merging connection 118 can comprise a constriction at the region in which the air duct from the separator unit 112 is introduced into the pressurizing air duct, or a Venturi tube, in order to increase the flow velocity. In addition, the merging connection 118 can connect to the metering device 109 via a separate inlet to the pressurizing air duct 108 upstream of the inlet of the pressurizing airflow in the metering device 109.

It will be appreciated that "nursing systems" which are shown herein can be used to dispense any chosen granular material within agriculture, such as seed, fertilizer or pesticide.

Furthermore, the merging connection can be implemented in metering devices which dispense the material with the aid of the positive air pressure, or in metering devices which dispense the material mainly with the aid of gravitational force.

The invention claimed is:

1. Agricultural tool comprising a device for feeding granular material, comprising:
    at least two metering devices;
    a first drive device, which, via a pressurizing air duct, is connected to the metering devices for generation of a pressurizing airflow for pressurization of the metering devices, and
    a central container, which is arranged to, via respective feed ducts, with the aid of a respective feed airflow, feed the material to at least one of the metering devices;
    wherein the metering devices comprise a respective separator for separating the material from the feed airflow,
    characterized by
    a second drive device for generation of said feed airflow; and
    a merging connection for merging at least a part (FL) of said feed airflow with the pressurizing airflow,
    wherein said merging connection comprises a connection for merging an airflow outflowing from the respective separator with the respective pressurizing airflow.

2. Agricultural tool according to claim 1, wherein a pressurizing air duct has a connection for airflow outflowing from the separator, which connection is situated upstream of the connection of the pressurizing air duct to the metering device.

3. Agricultural tool according to claim 1, wherein the separator is directly connected to the pressurizing air duct.

4. Agricultural tool according to claim 1, wherein the separator is connected to the pressurizing air duct via a merging duct.

5. Agricultural tool according to claim 1, wherein the second drive device is arranged to produce a greater air pressure than the first drive device.

6. Agricultural tool according to claim 1, wherein the metering device comprises a singling device for piece-by-piece dispensing of the material.

7. Agricultural tool according to claim 1, wherein the metering device comprises a singling disc, which has a high-pressure side and a low-pressure side, and wherein the connection of the pressurizing air duct to the metering device is located on the high-pressure side of the metering device.

8. Agricultural tool according to claim 7, wherein the metering device comprises an inlet, situated on the high-pressure side, for the granular material.

9. Agricultural tool according to claim 1, wherein the first and second drive devices are drivable independently of each other.

10. Method for dispensing granular material, in an agricultural implement, comprising:
    singling the granular material in a metering device and dispensing a series of individual granules,
    with the aid of a first drive device, generating a pressurizing airflow for pressurization of the metering device,
    characterized by
    from a central container for the granular material, with the aid of a feed airflow, feeding the material to at least two metering devices,
    generating the feed airflow with the aid of a second drive device, and
    separating the material from the feed airflow, wherein a material flow and an airflow are produced, and merging at least a part of the airflow with the pressurizing airflow.

11. Method according to claim 10, wherein the airflow is merged with the pressurizing airflow upstream of the inlet of the pressurizing airflow in the metering device.

12. Method according to claim 10, wherein both the pressurizing airflow and the material flow are fed to a high-pressure side of a singling device.

13. Method according to claim 12, wherein the pressurizing airflow and the material flow are fed via separate inputs.

* * * * *